United States Patent
Commins

(10) Patent No.: US 6,625,945 B2
(45) Date of Patent: Sep. 30, 2003

(54) BALANCED, MULTI-STUD HOLD-DOWN

(76) Inventor: Alfred D. Commins, 960 B Guard St., Friday Harbor, WA (US) 98250

(*) Notice: Subject to any disclaimer, the term of this patent is extended or adjusted under 35 U.S.C. 154(b) by 0 days.

(21) Appl. No.: 09/882,884

(22) Filed: Jun. 15, 2001

(65) Prior Publication Data

US 2002/0020137 A1 Feb. 21, 2002

Related U.S. Application Data

(60) Provisional application No. 60/223,758, filed on Aug. 8, 2000.

(51) Int. Cl.[7] .............................................. E02D 27/00
(52) U.S. Cl. ........................... 52/293.3; 52/295; 52/712
(58) Field of Search ........................ 52/293.3, 295, 52/712, 745.09, 293.1, 481.1; 403/312

(56) References Cited

U.S. PATENT DOCUMENTS

| | | | |
|---|---|---|---|
| 4,321,776 A | 3/1982 | Delight | 52/167 |
| 4,480,941 A | 11/1984 | Gilb et al. | 403/232.1 |
| 4,665,672 A | 5/1987 | Commins et al. | 52/295 |
| 4,875,314 A | 10/1989 | Boilen | 52/167 |
| 4,924,648 A * | 5/1990 | Gilb et al. | 52/295 |
| 5,042,217 A * | 8/1991 | Bugbee et al. | 52/643 |
| 5,092,097 A | 3/1992 | Young | 52/702 |
| 5,150,553 A | 9/1992 | Commins et al. | 52/264 |
| 5,249,404 A | 10/1993 | Leek et al. | 52/702 |
| 5,375,384 A * | 12/1994 | Wolfson | 52/295 |
| 5,384,993 A | 1/1995 | Phillips | 52/92.2 |
| 5,603,580 A | 2/1997 | Leek et al. | 403/232.1 |
| 5,699,639 A * | 12/1997 | Fernandez | 52/92.2 |
| 5,813,182 A | 9/1998 | Commins | 52/295 |
| 5,850,714 A * | 12/1998 | Liem | 52/293.3 |
| 5,921,042 A | 7/1999 | Ashton et al. | 52/291 |
| 5,987,828 A | 11/1999 | Hardy | 52/295 |
| 6,112,495 A | 9/2000 | Greg et al. | 52/712 |
| 6,389,767 B1 | 5/2002 | Lucey et al. | 52/295 |
| 2002/0066247 A1 * | 6/2002 | Leek | |

* cited by examiner

Primary Examiner—Carl D. Friedman
Assistant Examiner—Nahid Amiri
(74) Attorney, Agent, or Firm—Pate Pierce & Baird

(57) ABSTRACT

A hold-down for securing first and second support members in a portion of a building to an anchoring device extending from another portion of the building. The hold-down may include a first flange having securement apertures therethrough configured to receive fasteners adapted to secure the first flange to the first support member. A second flange may have securement apertures configured to receive fasteners adapted to secure the second flange to the second support member. A base may connect the first and second flanges and have an aperture sized and positioned to receive the anchoring device therethrough. The first and second flanges may be configured to be loaded substantially exclusively in tension by the anchoring device.

3 Claims, 17 Drawing Sheets

BALANCED, MULTI-STUD HOLD-DOWN

RELATED APPLICATIONS

This application claims priority to U.S. Provisional Application Serial No. 60/223,758, filed on Aug. 8, 2000 and directed to a MULTI-STUD CONCENTRIC HOLD-DOWN.

BACKGROUND

1. Field of the Invention

The present invention relates to building construction, and more specifically, to apparatus for anchoring walls to foundations and lower floors.

2. Background

Strong winds and earthquakes subject walls and others elements of a building to tremendous forces. If these forces are not distributed to the proper elements or structures capable of withstanding such force, the building may be torn apart. Foundations are often the strongest element of a building. Securely tying the walls of a building to the foundation greatly improves structural performance during periods of strong wind or earthquake. Securement promotes single body motion and limits whiplash amplification that often results in structural failure.

Under extreme conditions, a building may be violently loaded or shaken back and forth in a lateral (side to side) direction. If a shear wall is tightly restrained at its base, loads may be smoothly transferred to the foundation. The loads may then be resolved in the foundation, where they appear as tension and compression forces.

Buildings are often composed of long walls, (walls with a length greater than the height) and short walls (walls that have a length shorter than the height). The tendency for a wall to lift vertically off a foundation is inversely proportional to the length of the wall. Tall narrow shear walls, which may be found in nearly all homes, act as lever arms and may magnify an imposed load. In certain instances, the actual load on the securement system may be magnified to several times the originally imposed load.

Wall securement may prevent lateral and vertical motion between the walls and the foundation. Additionally, it may be necessary to support the wall against forces that would tend to distort the wall's general rectangular shape. Building codes often require external and load bearing walls to be shear resistant by providing a plywood plane to support shear forces that may be imposed on the wall. Many times, building codes also require lateral and vertical securement of a wall to the foundation. Lateral and vertical securement may be accomplished by employing hold-downs, also referred to as tie-downs.

Typically, hold-downs are attached eccentrically, spaced from the neutral axis, on a selected number of support members (e.g. posts, beams, or studs) which make up the wall of building. Eccentric attachment introduces a moment in the support member that greatly reduces the tensile capacity thereof. Eccentric attachment may also cause the support member to deflect excessively. The tensile force caused by tightening the hold-down may cause the support member to bow. Bowing tends to promote column buckling and reduces the effectiveness of the support member to provide sufficient structural support.

Moreover, hold-downs are difficult to install and expensive to fabricate. Accordingly, a need exists for a balanced hold-down that may be easily installed. It would be a further advancement to provide a balanced hold-down that may be produced in greater quantities with greater speed and less expense.

BRIEF SUMMARY AND OBJECTS OF THE INVENTION

It is an object of the present invention to provide a balanced hold-down that may be easily and quickly secured to support members.

It is a further object of the present invention to provide a hold-down that may be mass produced inexpensively.

In certain embodiments, an apparatus and method in accordance with the present invention may include a hold-down for securing first and second support members to an anchoring device in a balanced manner. The anchoring device may extend from a foundation or from a wall up through a floor to another wall positioned thereabove. When an anchoring device extends through a floor, hold-downs in accordance with the present invention may be used to engage and secured both ends thereof.

A hold-down in accordance with the present invention may have a first flange, a second flange, and a base connecting the first and second flanges and having an aperture for admitting an anchoring device. The first and second flanges may engage first and second support members respectively. The first and second flanges may each have multiple securement apertures. The securement apertures may allow a securement mechanism to be introduced therethrough to engage the first or second support member or both. In certain embodiments, the securement mechanism may be a nail. The securement mechanisms may be admitted into the support members in a manner selected to substantially reduce splitting of the support member. The number of securement apertures and accompanying securement mechanisms may be selected to provide sufficient engagement to meet or exceed a minimum strength requirement. The minimum strength requirement may be selected to meet a given building code.

A hold-down in accordance with the present invention may be loaded in tension when in use. Tensile loading may permit a hold-down to be formed of a relatively thin material (e.g. sheet metal). A hold-down that may be loaded in compression will likely be made of a relatively thick material. The thicker material may be needed to resist buckling as well as the applied load. A hold-down loaded in tension may only need to resist the applied load. As a result, a hold-down to be loaded in tension may be lighter, more easily manufactured, and cheaper than a hold-down to be loaded in compression.

In one embodiment, the hold-down is installed by securing the first flange to a first support member and securing the second flange to a second support member. An anchoring device may be admitted through an aperture provided in the base. A fastener may be tightened on the anchoring device to load the first and second flanges in tension.

In certain embodiments, the base may be formed to resist distortion or failure thereof during installation and the subsequent loading that may be experienced during strong winds, earthquakes, and the like. The base thickness may be selected to resist distortion and unwanted flexing. Additionally, the base may be formed in a manner to increase the section modulus thereof. Distortion and unwanted flexing of the base may also be substantially reduced by positioning an insert, having the strength and rigidity needed to resist the forces of use, over the base.

In certain applications, selected embodiments in accordance with the present invention may provide a hold-down for engaging first and second support members having rectangular cross-sections. Such rectangular support members may each have an inside face, outside face, left side, and right side. The first and second support members may be arranged so that inside faces face each other. In such a configuration, the first flange may be secured to the inside face of the first support member while the second flange may be secured to the inside face of the second support member. In another embodiment, the first flange may be secured to left and right sides of the first support member while the second flange may be secured to left and right sides of the second support member.

Securement mechanisms may be introduced through securement apertures of each flange at any suitable angle with respect to the surface to which the given flange is being secured. The angle at which the securement mechanism is introduced may be selected to mitigate the risk of splitting the support member. In certain embodiments, the first and second flanges may be formed in a manner to provide a flat, parallel surface to facilitate introduction of the securement mechanism into the support member at an angle other than normal and to contact a head of the securement mechanism.

In some applications, the outside faces of the first and second support members may be inaccessible. Certain embodiments in accordance with the present invention allow for the securement mechanisms to be introduced through the first or second flange and into the first or second support member without access to the outside faces of either support member. Additionally, the hold-down may be formed to allow the securement mechanism to be installed from a location that is not collinear with the first and second support members.

A method for fabricating a hold-down is also included within the scope of the present invention. The method of fabrication may include cutting a blank, such as a selected shape of sheet metal, to sustain forming into a first flange, a second flange, and a base. The first and second flanges may have securement apertures extending therethrough. The blank may be formed or bent to position the first and second flanges substantially parallel to one another with the base connecting the first flange to the second flange, permitting the first and second flanges to engage a first and a second support member in a balanced manner.

Consistent with the foregoing objects, and in accordance with the invention as embodied and broadly described herein, an apparatus and method are disclosed in suitable detail to enable one of ordinary skill in the art to make and use the invention. The features, and advantages of the present invention will become more fully apparent from the following description, or may be learned by the practice of the invention as set forth hereinafter.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 17, is not intended to limit the scope of the invention. Several Figures display an automatic take-up device. This device is described fully in U.S. Patent Application Ser. No. 60/156,042 previously filed by this inventor, and incorporated herein by reference.

Those of ordinary skill in the art will, of course, appreciate that various modifications to the details of the Figures may easily be made without departing from the essential characteristics of the invention. Thus, the following description of the Figures is intended only by way of example, and simply illustrates certain embodiments consistent with the invention.

Figure 1:
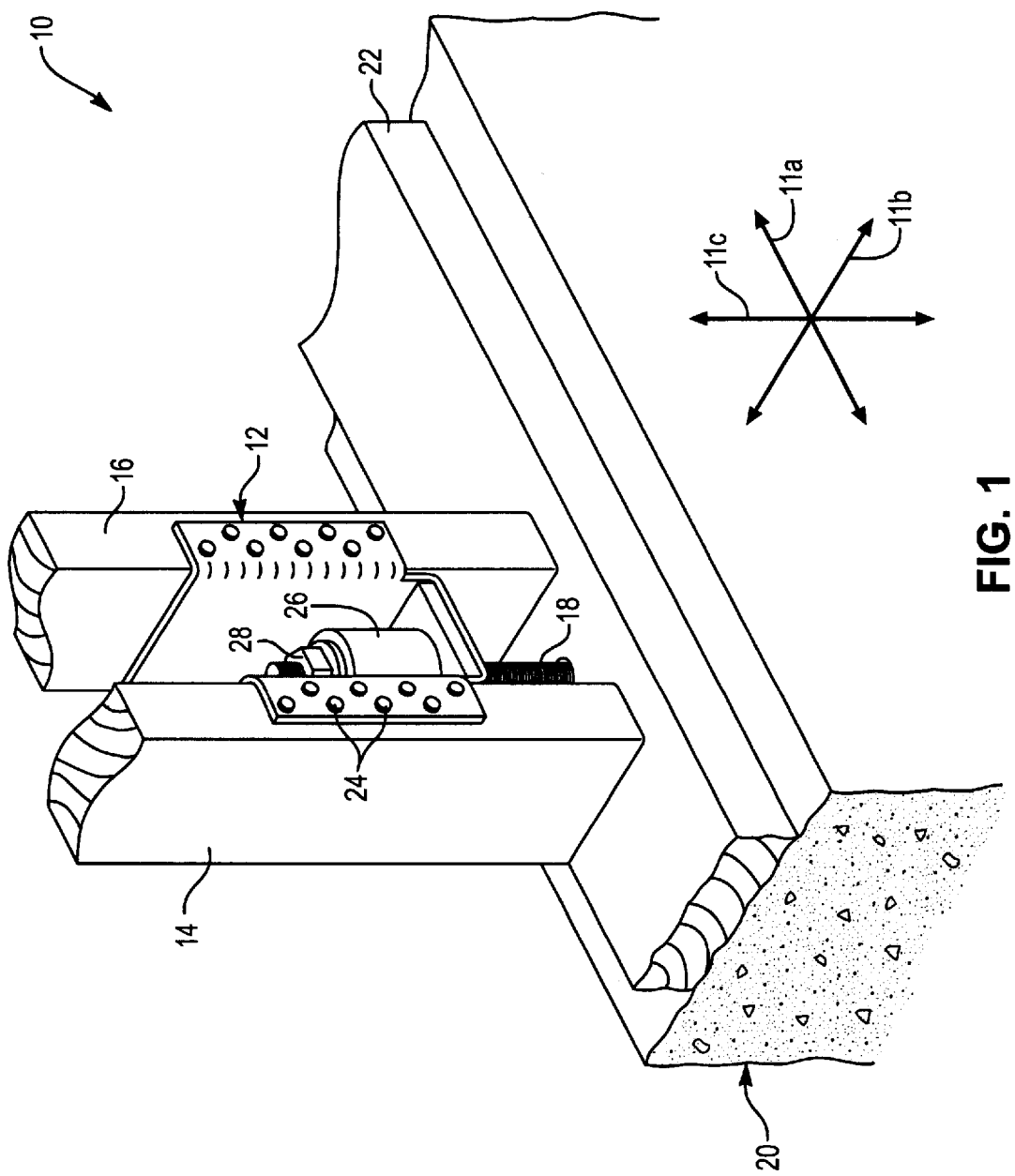
FIG. 1 is a perspective view of a reinforcement in accordance with the present invention.

Referring to FIG. 1, in discussing the Figures, it may be advantageous to establish a reliable coordinate system to aid in the description of several of the embodiments in accordance with the present invention. Coordinate axes 11 may be defined by longitudinal 11a, lateral 11b, and transverse directions 11c substantially orthogonal to one another. In the description to follow, the embodiments will be oriented so that they are aligned and primarily configured to oppose or transfer forces in a transverse direction 11c. Embodiments in accordance with the present invention may resist or transfer forces and loads along more than one axis simultaneously. Several embodiments, however, may be particularly well suited to resisting or transferring loads in a given direction, and as previously mentioned, this principal axis will typically be substantially the transverse axis 11c.

A reinforcement 10 in accordance with the present invention may include a hold-down 12, which engages a first support member 14 and a second support member 16. The support members 14, 16 may be any structural support member that may be used in construction. The support members 14, 16 may have a variety of cross-sectional configurations, such as rectangular, circular, I-beam, or any other suitable design. Typical materials include wood and metal. However, embodiments in accordance with the present invention may be applied to support members 14, 16 made of any material having the desired structural characteristics.

An anchoring device 18 may extend transversely 11c from a foundation 20, through a sill 22, and into the hold-down 12. Once installed, the hold-down 12 may transfer the loads applied to the support members 14, 16, to the anchoring device 18 for subsequent transfer to the foundation 20.

As illustrated in FIG. 1, both support members 14, 16 may extend substantially transversely. A hold-down 12, comprising first and second flanges, each having a first and second surfaces non-coplaner with respect to one another, wherein the first surfaces abut the first and second studs respectively, and the second surfaces are provided with securement apertures positioned to received fasteners to penetrate the first and second studs respectively may ensure that the support members 14, 16 do not lift transversely away from the foundation 20. In addition, the hold-down may laterally secure the support members 14, 16 to the foundation 20 in a manner to ensure that the foundation 20 and support members 14, 16 move laterally (e.g. side to side) together in unitary motion.

The hold-down 12 may be secured to the support members 14, 16 by securement mechanisms 24. The securement mechanisms 24 may be nails, rivets, screws, bolts, welds, glue, tethers, staples, or the like, depending on the support members 14, 16 and any other functional desires for a suitable attachment device. In selected embodiments, the securement mechanisms 24 may be selected to reduce or substantially eliminate the cutting of fibers of the support members 14, 16. For example, if the support members are wood, a nail may be used as a securement mechanism 24. The nails may divide the fibers of the support members 14, 16 without cutting substantial numbers of them. Thus, the support members may not be significantly weakened in the direction of the fibers.

In certain embodiments, the securement mechanisms 24 are selected to enable installation by a power tool. Such a power tool may include a stapler, screw driver, nail gun, nut driver, wrench, or other suitable implement. In one embodiment, the securement mechanisms 24 are nails capable of installation by a nail gun.

An automatic take-up device 26 may be included in certain embodiments of the reinforcement 10. A automatic take-up device allows a hold-down 12 to compensate, adjust, and prevent transverse gapping that often occurs due to shrinkage of the support members 14, 16 and the sill 22. A fastener 28 may engage the anchoring device 18 in a manner to transversely pull the support members 14, 16 and the sill 22 firmly against the foundation 20. Thus, the hold-down 12 may be principally loaded in tension.

Figure 2:
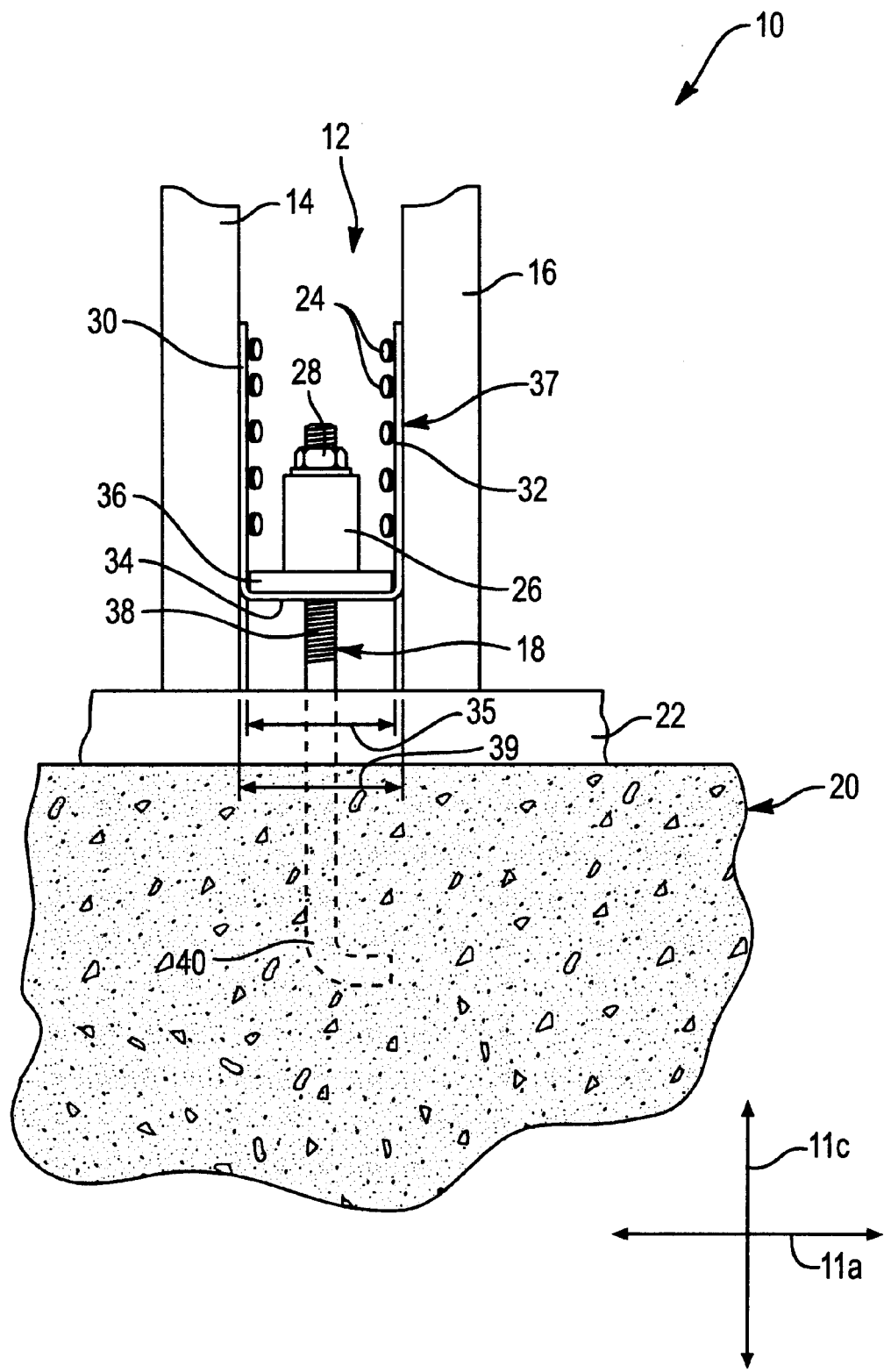
FIG. 2 is a side view of the embodiment in FIG. 1.

Referring to FIG. 2, one embodiment of a hold-down 12 in accordance with the present invention may have a first flange 30 and a second flange 32. A base 34 may connect the first and second flanges 30, 32. The base 34 may have a width 35 selected to balance considerations such as accessibility to the fastener, equal loading of the support members 14, 16, and the maximum bending moment the base 34 may withstand. The hold-down 12 may be constructed of a material having selected properties to optimize performance, such as rigidity, toughness, bending strength, resistance to tearing or distortion, survivability, tensile strength, and the like. In certain embodiments, the hold-down 12 may be made of a metal. Alternative materials may include selected polymeric materials, composite materials, wooden structures, and the like.

A hold-down 12 in accordance with the present invention may be loaded in tension when in use. A hold-down 12 loaded in tension may be constructed of a relatively thin material. A hold-down 12 loaded in compression likely will be made of a relatively thick material. The material used in the construction of compression hold-down 12 may be thicker to resist buckling as well as the applied load. A hold-down 12 loaded in tension, on the other hand, need only resist the applied load. As a result, a hold-down 12 to be loaded in tension may be lighter, more easily manufactured, and cheaper than a hold-down 12 to be loaded in compression.

A method for fabricating a hold-down 12 may include cutting a selected shape out of a base material, such as sheet metal, to form a blank 37. Portions of a blank 37 may include regions suitable for forming into a first flange 30, a second flange 32, and a base 34. The blank 37 may be formed, such as by bending, to position the first and second flanges 30, 32 opposite and substantially parallel to one another with the base 34 connecting the first flange 30 to the second flange 32. The first and second flanges 30, 32 are formed to engage the first and the second support members 14, 16, respectively, in a balanced, concentric manner, with any eccentricity minimized. If desired, the blank 37 may have scoring, thinning, marking, or the like to provide preferential bending lines incorporated therewith to facilitate bending and forming the hold-down 12 to the correct geometry.

In an alternative embodiment, the first and second flanges 30, 32 may secured to the base 34 by one or more fasteners. In such a configuration, the first flange 30, the second flange 32, and base 34 may be formed separately. The components 30, 32, 34 may then be linked, secured, or otherwise integrated together so that the first and second flanges 30, 32 are opposed and substantially parallel to one another with the base 34 connecting the first flange 30 to the second flange 32. The fastening mechanism, for securing the first flange 30 to the base 34 and the base 34 to the second flange 32, may be selected for durability, ease of installation, reliability, and so forth. A bolt, rivet, glue, weldment, tabs, mortices and tenons, interlocking portions, or the like may be suitable. The first and second flanges 30, 32 may be formed to engage the first and second support members 14, 16, respectively, in a balanced manner.

In selected embodiments, the first and second flanges 30, 32 and the base 34 may be formed already in a final configuration. This forming may be the result of a molding process. In alternative embodiments, the hold-down 12 is formed in a final configuration by laying up and curing a composite in the desired shape.

In certain embodiments, an insert 36 may be placed over the base 34 to increase the rigidity of the hold-down 12 and resist flexing and deformation of the base 34 as the fastener 28 is tightened. Additionally, the insert 36 may reinforce against, or distribute, loads throughout the hold-down 12 to withstand larger forces imposed thereon by strong winds, earthquakes, and the like. If desired, the insert 36 may be secured to the base 34 to be fixed thereto, self aligning therewith, or in any other suitable manner. The insert 36 may be constructed of a material having selected properties to optimize performance, such as rigidity, toughness, bending strength, resistance to tearing or distortion, survivability, and the like. In certain embodiments, the insert 36 may be made of a suitable metallic material.

The advisability or benefit of an insert 36 may be a function of the span 39 between the support members 14, 16, the thickness of the base 34, and the expected loading of the hold-down 12. The span 39 between the support members 14, 16 may affect how wide the base 34 must be. For a given loading of the hold-down 12, the wider the base 34, the larger the bending moment that the base 34 may be required to withstand. If the span 39 between the support members 14, 16 is small, or if the base 34 is made of material with sufficient thickness, the insert 36 may be obviated. Alternatively, the base may be formed to be curved or otherwise narrowed in order to reduce or substantially eliminate bending moments in the base 34.

In selected embodiments, an anchoring device 18 may have a fastener portion 38 and an anchoring portion 40. In one embodiment, a fastener portion 38 may provide a method for securing the fastener 28. For example, the fastener portion 38 may be threaded to accept a nut 28. Such an anchoring device 18 may be embodied as a tie-bolt 18. The anchor portion 40 of the anchoring device 18 may be shaped to provide a strong hold in or on the foundation 20 or a lower portion of a building. In many applications, the foundation 20 may be concrete. In such a case, the anchor portion 40 of the anchoring device 18 may be introduced into the concrete before it cures.

It may be readily appreciated that a hold-down 12 in accordance with the principles of the present invention may be modified to provide tensioning and proper load transfer with a wide variety of anchoring devices 18.

Figure 3:
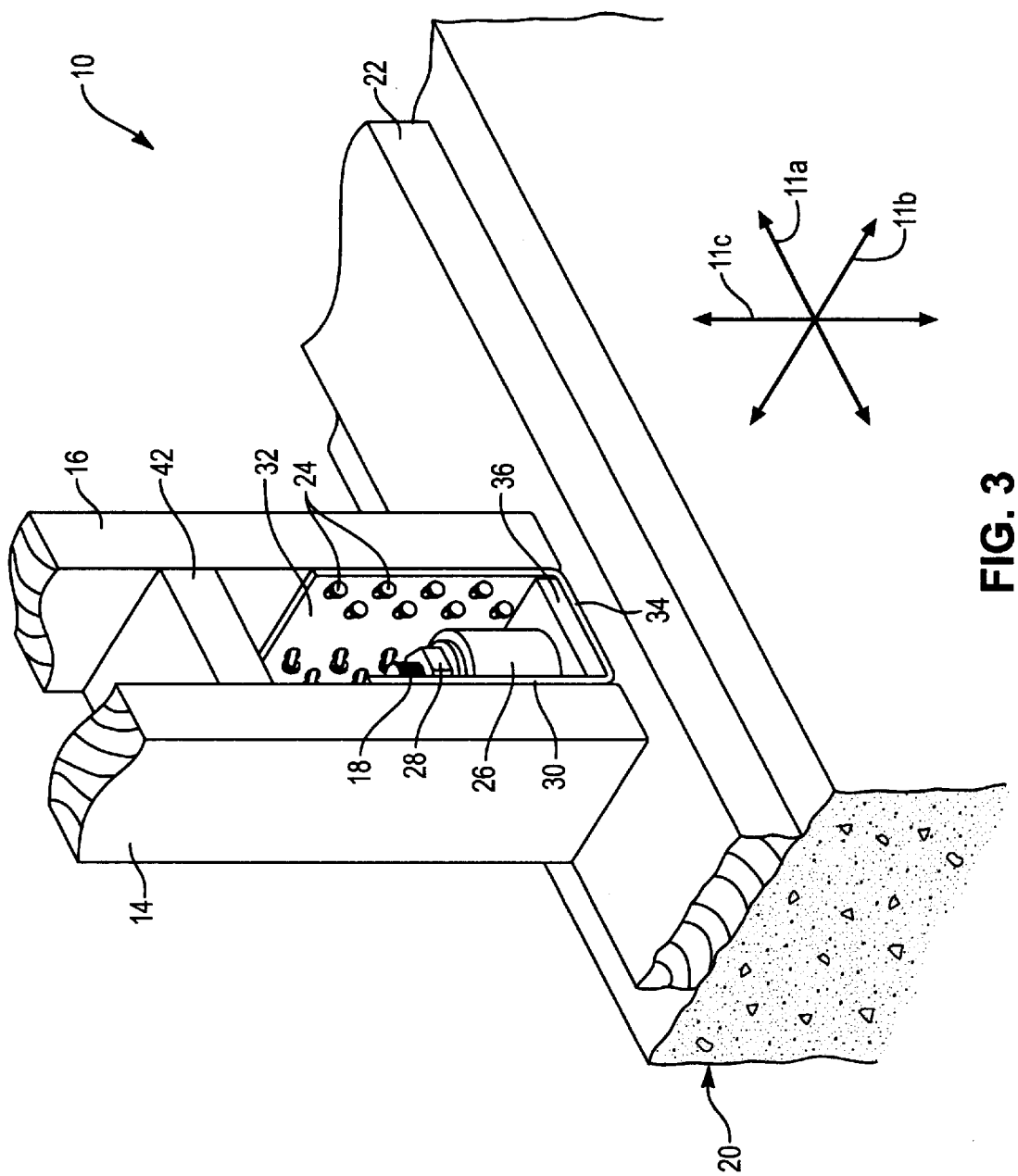
FIG. 3 is a perspective view of an alternative embodiment of a reinforcement in accordance with the present invention.

Referring to FIG. 3, in selected applications, it may be advantageous to secure the base 34 of the hold-down 12 directly against the sill 22. Such a configuration may transversely hold the support members 14, 16 and the sill 22 firmly against the foundation 20 or other structures below. Bearing capacity of the wall may be greatly increased by the configuration illustrated in FIG. 3. Preliminary tests indicate that with the base 34 of the hold-down 12 directly against the sill 22 the bearing capacity of the support members may be more than doubled.

In selected embodiments, a compression block 42 may form part of the reinforcement 10. The compression block 42 may be placed longitudinally between the first and second support members 14, 16. The compression block 42 may be independent from the hold-down 12, or may be formed therewith. If the block 42 is formed as part of the hold-down 12, it may extend longitudinally between the first and second flanges 14, 16 at a position transversely opposed to the base 34.

Figure 4:
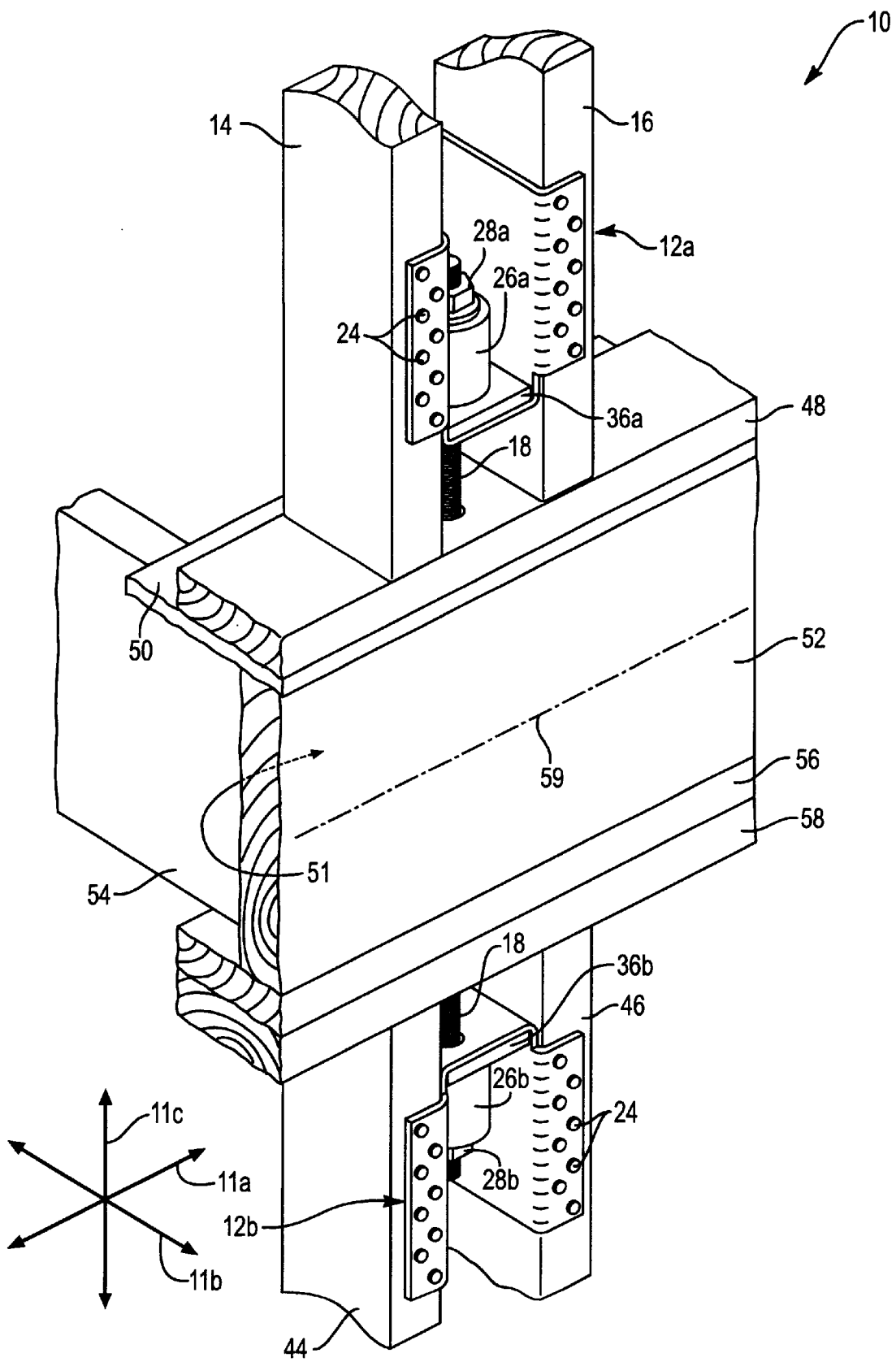
FIG. 4 is a perspective view of an alternative application of a reinforcement in accordance with the present invention.

Referring to FIG. 4, embodiments in accordance with the present invention may be applied to transversely secure the support members 14, 16 of a upper floor to support members 44, 46 of lower floor. Such a configuration provides transverse securement, even across different floors. To achieve the optimum results, it may be beneficial to secure the support members 44, 46 of the lower floor to the foundation 20 as described hereinabove. A continuously connected structural path may then be formed from the foundation to the uppermost wall or support members. In combination with an adequate shear wall, the reinforcements 10 in accordance with the present invention may greatly improve unitary motion between the foundation 20 and all support members.

When transversely securing through a floor, an anchoring device 18 may transversely extend from a first hold-down 12a down through a base board 48. The anchoring device 18 may extend through the flooring 50, the space 51 created by a header 52 and trusses 54, top boards 56, 58, to a second hold-down 12b.

In a support member-to-support member reinforcement 10 as illustrated in FIG. 4, the first and second hold-downs 12a, 12b may be arranged as mirror images of each other across a longitudinally extending centerline 59. The two hold-downs 12a, 12b need not, however, be identical embodiments. A differently arranged hold-down 12 in accordance with the present invention may be applied to either the upper or lower floor depending on construction constraints and accessibility.

Figure 5:
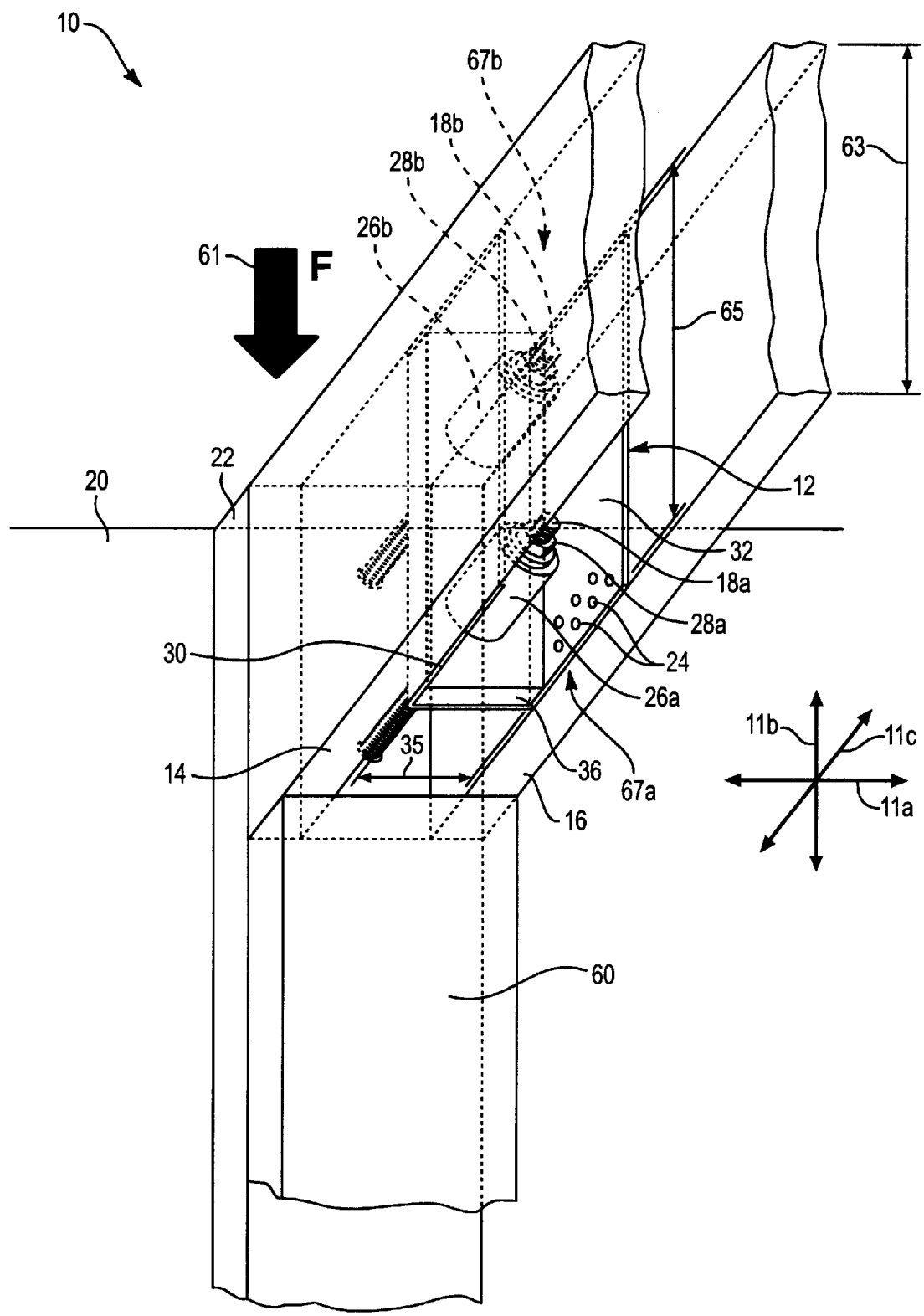
FIG. 5 is a perspective view of another alternative application of a reinforcement in accordance with the present invention.

Referring to FIG. 5, as discussed hereinabove, embodiments in accordance with the present invention may be applied to vertical securement of support members to horizontally extending foundations (e.g. securing support members to foundations, where the foundations are positioned to support the weight of the support members). Embodiments in accordance with the present invention may also be applied to horizontal securement of support members to more vertically extending foundations. In such a configuration, the support members may be secured to vertically extending portions of foundations, where the foundations do not support all of the weight of the support members. This application may be useful in securing horizontally extending support members 14, 16 to a foundation wall 20.

In describing the embodiments that may be applied to the present application, a similar naming and numbering convention will be used. The coordinate axes 11a, 11b, 11c will be rotated so that the transverse 11c direction will maintain alignment with the principal axis of securement.

A hold-down 12 may engage a first support member 14 and a second support member 16. A load support beam 60 may be installed to carry the lateral load 61 that may be applied to the support members 14, 16. A first anchoring device 18a may extend transversely from a foundation wall 20, through a sill 22, and into the hold-down 12. If desired, a second anchoring device 18b may also extend transversely 11c from the foundation wall 20, through the sill 22, and into the hold-down 12. For the sake of illustration, it will be assumed that the current application will involve both a first and a second anchoring device 18. The present embodiment in no way requires two anchoring devices 18a, 18b and the both are included only to illustrate that multiple anchoring devices 18a, 18b may be a feasible option.

The hold-down 12 may be secured to the support members 14, 16 by a plurality of securement mechanisms 24. Automatic take-up devices 26a, 26b may be included in the installation of certain embodiments of the reinforcement 10. Fasteners 28a, 28b may engage the anchoring devices 18a, 18b, respectively, in a manner to transversely pull the support members 14, 16 and the sill 22 firmly against the foundation wall 20.

As discussed hereinabove, the hold-down 12 may have a first flange 30 and a second flange 32. A base 34 may connect the first and second flanges 30, 32. The base 34 may have a width 35 selected to balance considerations such as accessibility to the fastener, balanced loading of the support members 14, 16, and maximum bending moment the base 34 may withstand.

Horizontally extending support members, such as support members 14, 16 illustrated in FIG. 5, are typically loaded in bending. Bending loads often require that the support members 14, 16 have a greater lateral width 63 to resist the induced bending moment. In selected embodiments in accordance with the present invention, the lateral dimension 65 of the hold-down 12 may be selected to match the lateral width 63 of the support members 14, 16. Such an arrangement may facilitate the introduction of the securement mechanisms 24 from both sides 67a, 67b of the support members 14, 16. Once installed, the hold-down 12 may transfer the loads applied to the support members 14, 16, to the anchoring devices 18a, 18b for subsequent transfer to the foundation wall 20.

Referring to FIGS. 6–17, a hold-down 12 in accordance with the present invention may be arranged in a multitude of configurations. The different configurations may provide different advantages in different construction applications. The embodiments contained in FIGS. 6–17 are intended to be illustrations of a variety of configurations that may be included within the scope of the present invention. The embodiments are not to be considered as limiting the scope of the invention.

In reference to the Figures, it may be advantageous to establish a reliable system to aid in discussing the surfaces of the support members 14, 16. If the support members 14, 16 are generally rectangular in cross-section, then the outside faces of support members 14, 16 may be referenced by identifiers 62a and 62b, respectively. The inside faces of support members 14, 16 may be referenced by identifiers 64a and 64b, respectively. For the sake of distinguishment, identifiers 66a and 66b may refer to the left sides of support members 14, 16, respectively. Identifiers 68a and 68b may refer to the right sides of support members 14, 16, respectively. In the event that the support members 14, 16 are non-rectangular in cross-section, the cross-sections may theoretically be divided into quadrants to which the names and identifiers discussed hereinabove may refer.

Figure 6:
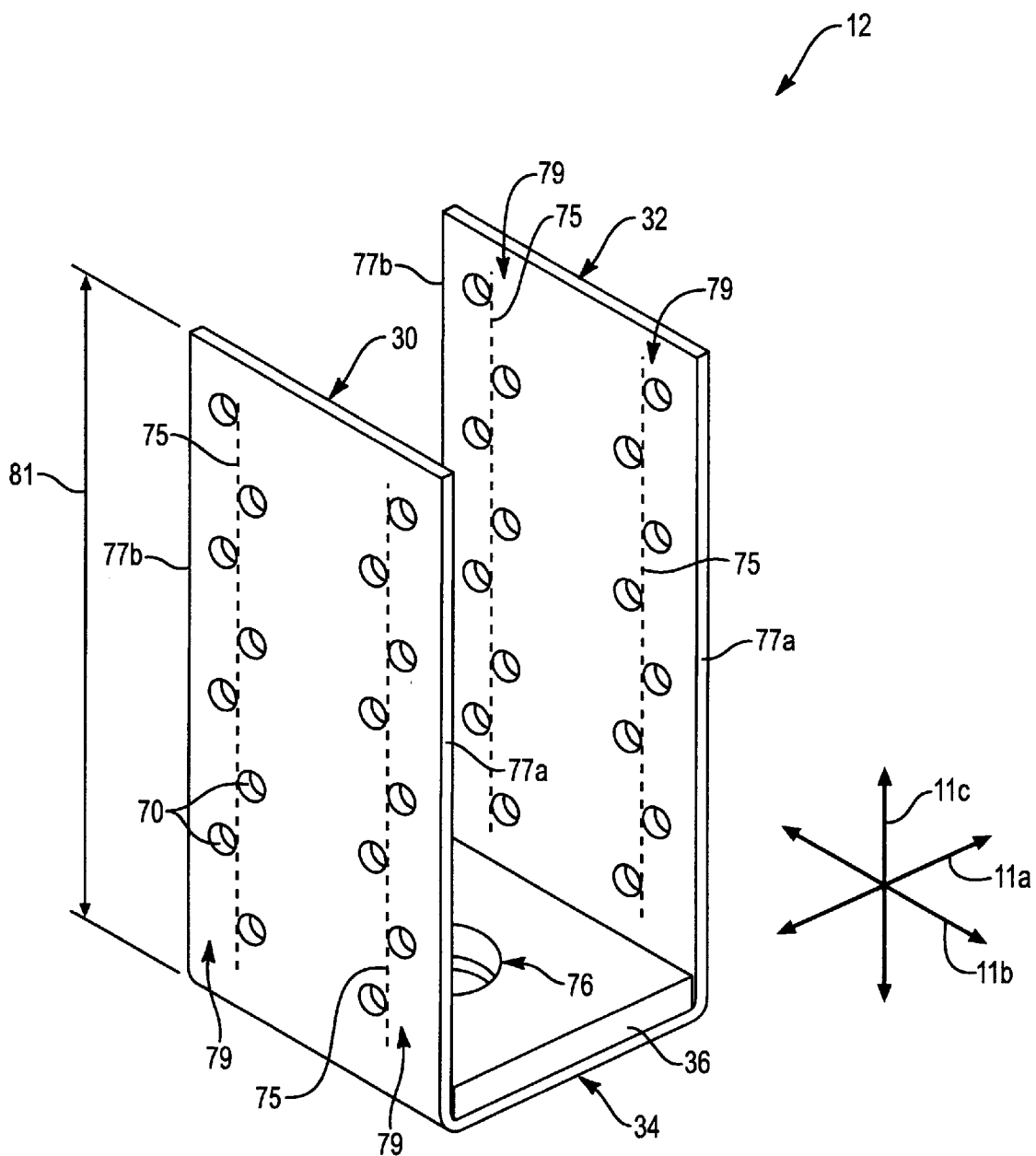
FIG. 6 is a perspective view of one embodiment of a hold-down.
Figure 7:
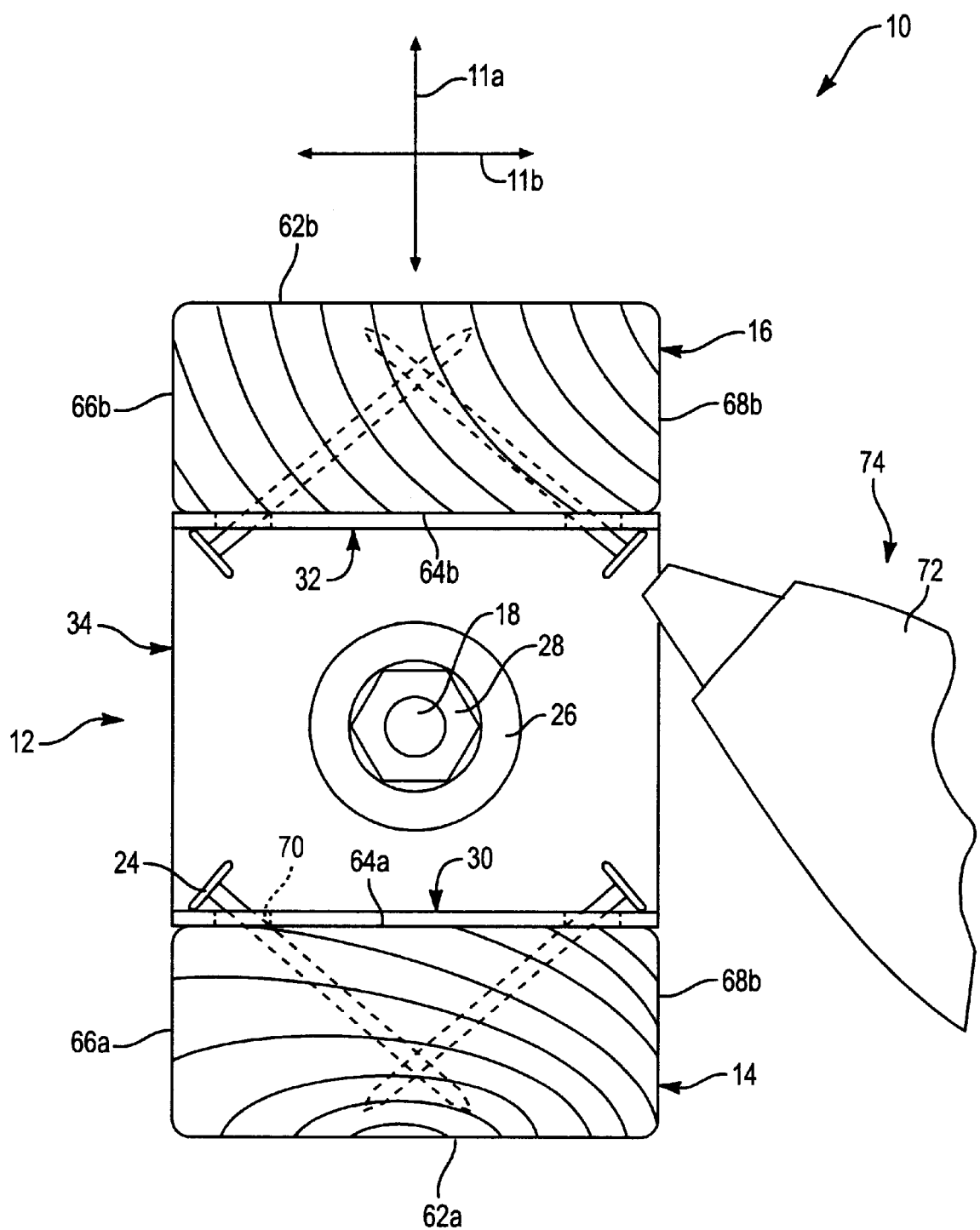
FIG. 7 is a top plan cross-sectional view of a reinforcement using the hold-down of FIG. 6.

Referring to FIGS. 6 and 7, the Figures, particularly FIG. 6, provide a view of a plurality of securement apertures 70. The securement apertures 70 may permit a securement mechanism 24 to pass therethrough to engage the appropriate support member 14, 16. In this particular embodiment, the securement mechanisms 24 engage the support members 14, 16 through the inside faces 64a, 64b, respectively.

The size of the securement apertures 70 may be selected to admit the securement mechanism 24 without excess gapping, thereby reducing unwanted motion between the securement aperture 70 and the securement mechanism 24. In certain embodiments, the securement apertures 70 may be formed to guide the securement mechanism 24 into the support member 14, 16 at the desired angle with respect to the inside engagement surface 64a, 64b. If desired, the securement apertures 70 may be reinforced to resist the shear forces applied thereto during installation and subsequent use.

The securement mechanisms 24 may be introduced at an angle into the support member 14, 16. The angled insertion may reduce splitting of support members 14, 16, if they are made of wood. Additionally, the angled insertion may allow the securement mechanism 24 to be installed by a tool 72 from a location 74 that is not positioned longitudinally between the first and second support members 14, 16. Furthermore, such an installation of the hold-down 12 does not require access to the outside surfaces 62a, 62b of the support members 14, 16, respectively. In practice, access to the outside surfaces 62a, 62b is often limited and in some applications nonexistent.

In certain embodiments, the securement apertures 24 may be distributed along a transversely extending line 75 proximate the lateral edges 77a, 77b of the first and second flanges 30, 32. Such a configuration may provide four transverse rows 79 of securement apertures 70. In selected embodiments, the securement apertures 70 may be alternatingly staggered laterally along the transversely extending lines 75. The alternation may provide additional protection against splitting support members 14, 16 made of wood.

The number of securement apertures 70 may be selected to provided access for a selected number of securement mechanisms 24. The number of securement mechanisms 24, in turn, may be selected to meet or exceed a given ultimate strength requirement of the reinforcement 10. The length 81 of the flanges 30, 32 in a transverse direction 11c may be selected to accommodate the required number of securement apertures 70.

An anchoring device aperture 76 may be provided through the base 34 and the insert 36, if an insert 36 is to be included. The anchoring device aperture 76 may admit an anchoring device 18 therethrough. By tightening a fastener 28, the hold-down 12 may secure the support members 14, 16 to a foundation 20, a foundation wall 20, or support members 44, 46 of a lower floor.

Figure 8:
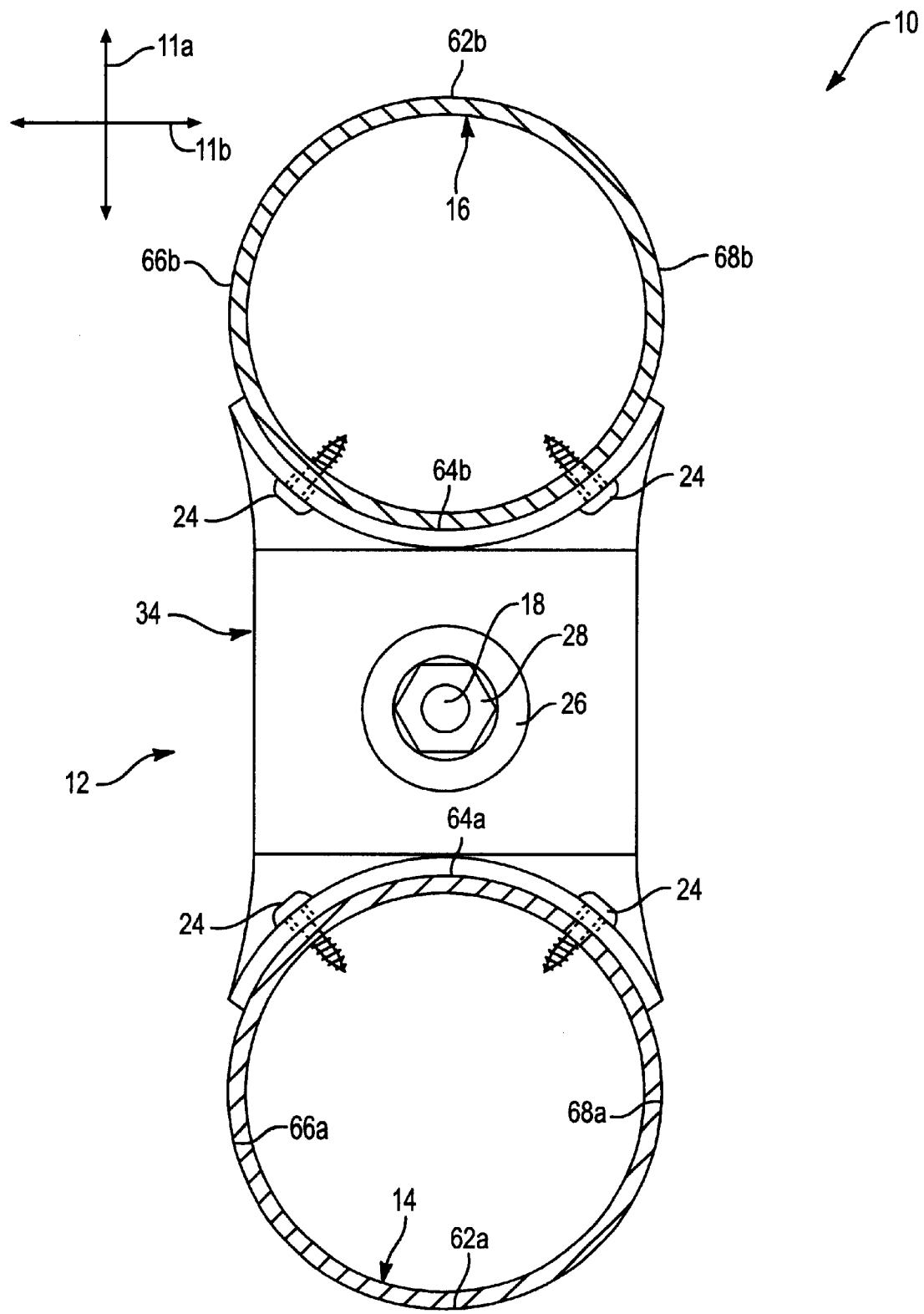
FIG. 8 is a top plan cross-sectional view of a reinforcement in accordance with the present invention.

Referring to FIG. 8, as discussed hereinabove, embodiments of the present invention may be applied to support members 14, 16 of non-rectangular cross-section. For example, a hold-down in accordance with the present invention may be applied to circular cross-sectioned support members 14, 16. FIG. 8 illustrates circular support members 14, 16 of tubular construction. The first and second flanges 30, 32 may be formed to contour to the shape of the corresponding support members 14, 16.

The curvature of the support members 14, 16 may allow the securement mechanisms 24 to be introduced perpendicularly therein without sacrificing the ability to install the securement mechanisms 24 from a location 74 that is not longitudinally 11a between the first and second support members 14, 16. As illustrated, penetrating fasteners 24 such as screws 24, nails 24, or the like, may be used as the securement mechanisms 24.

Figure 9:
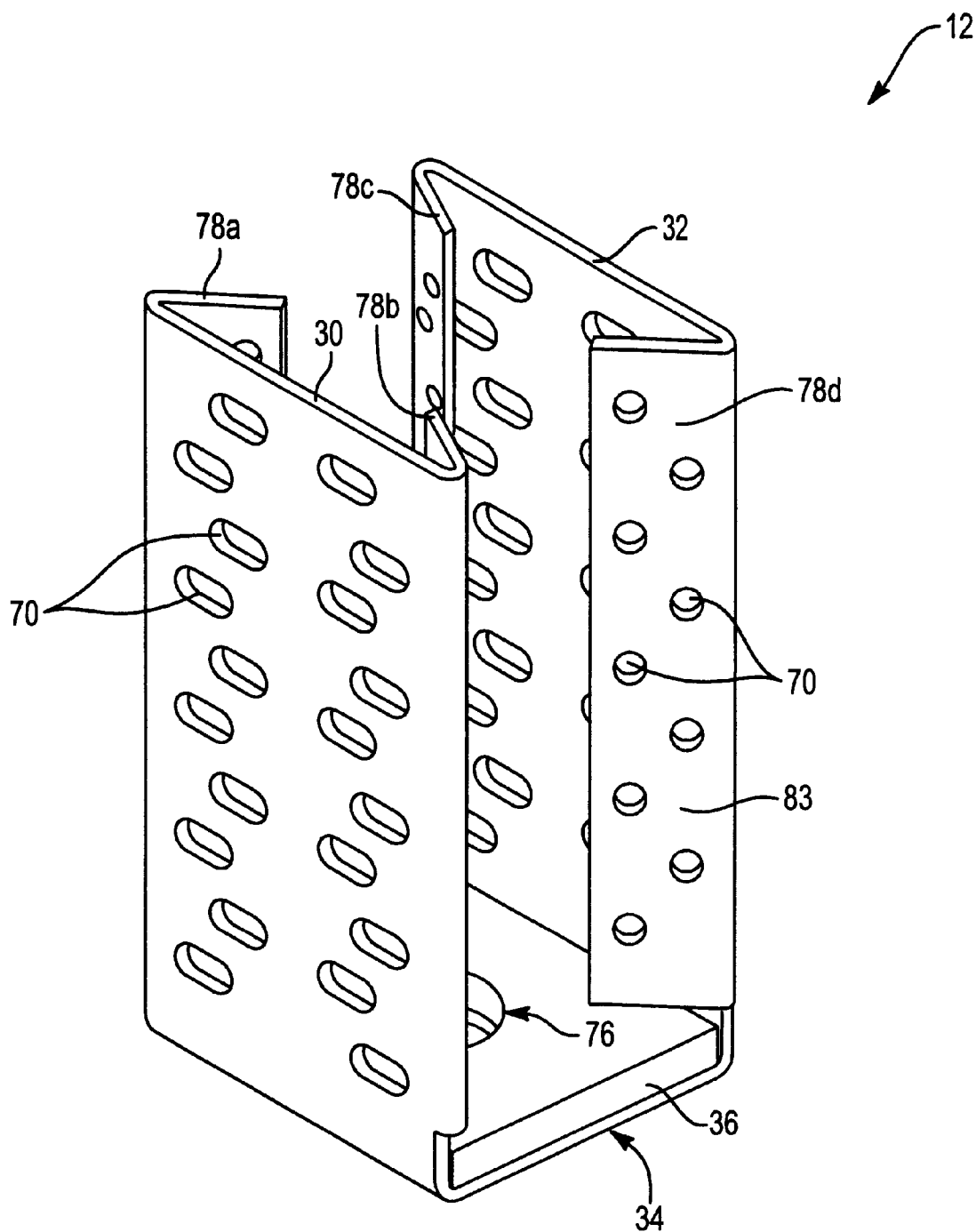
FIG. 9 is a perspective view of another embodiment of a hold-down.
Figure 10:
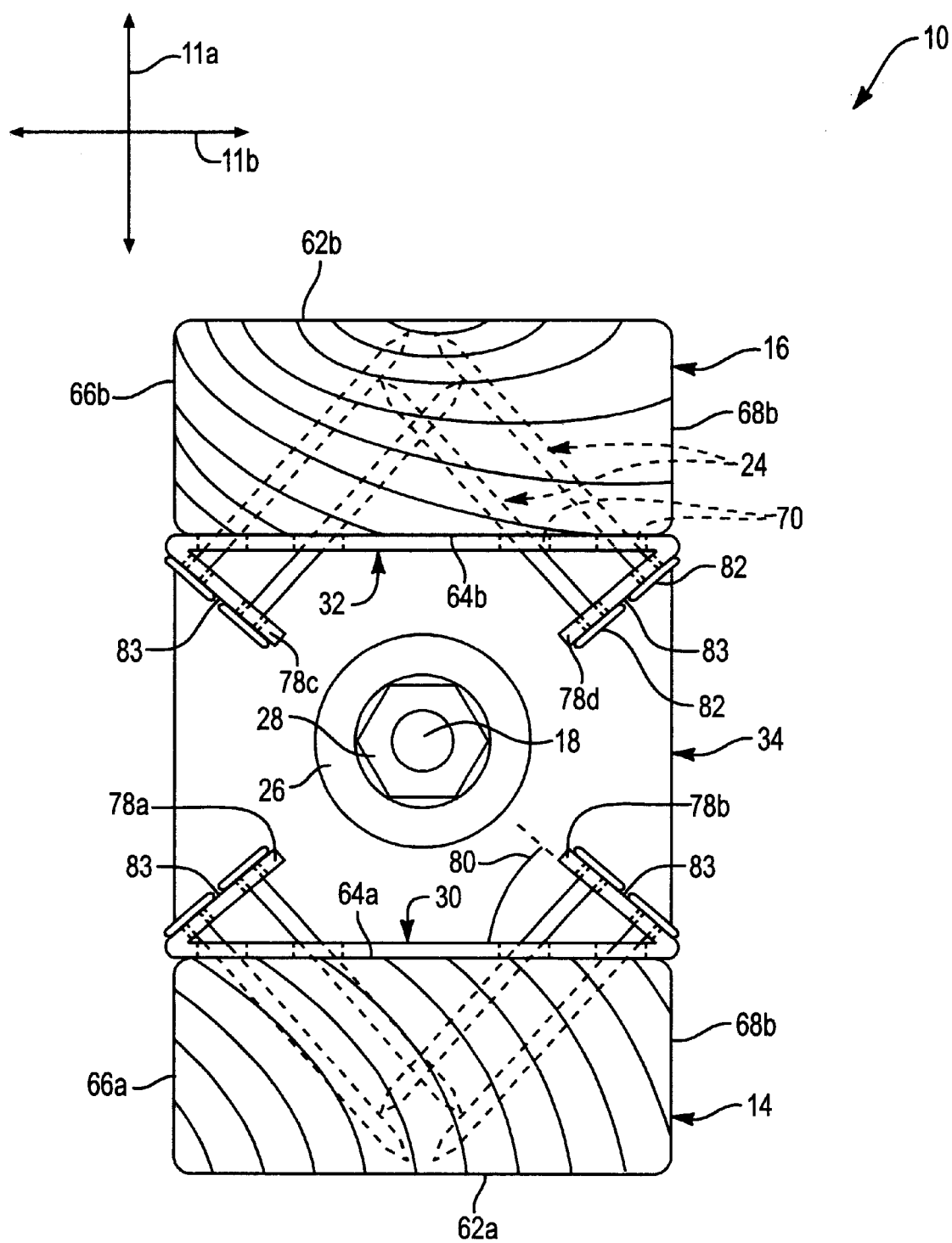
FIG. 10 is a top plan cross-sectional view of a reinforcement using the hold-down of FIG. 9.

Referring to FIGS. 9 and 10, one embodiment of a hold-down demonstrates a manner in which the hold-down 12 embodiment may be installed. In selected embodiments, the first and second flanges 30, 32 may be equipped with brackets 78. In certain embodiments, brackets 78a, 78b may be formed as a continuous piece with the first flange 30. The brackets 78a, 78b may bend back towards the center of the hold-down 12 to form an angle 80. In a similar arrangement, brackets 78c, 78d may be formed as a continuous piece with the second flange 32 and then bent back towards the center of the hold-down 12.

The angle 80 may be selected to guide a securement mechanism 24 introduced into the support members 14, 16 at a selected angle with respect to the inside surfaces 64a, 64b, while maintaining a bracket surface 83 that may be parallel to a head 82 of the securement mechanism 24. Providing a bracket surface 83 parallel to the head 82 of the securement mechanism 24 may facilitate installation of the securement mechanism 24.

As a result of the brackets 78a, 78b and 78c, 78d being bent back over the flanges 30, 32, respectively, each securement mechanism 24 may require two securement apertures 70 to gain access to the support members 14, 16. The number and location of the securement apertures 70 may be selected to resist splitting of support members 14, 16 and provide the required strength of the reinforcement 10 when the securement mechanisms 24 are installed. Allowing the securement mechanisms 24 to pass through multiple securement apertures 70 may provide a guide for installing the securement mechanisms 24 at any desired angle.

Figure 11:
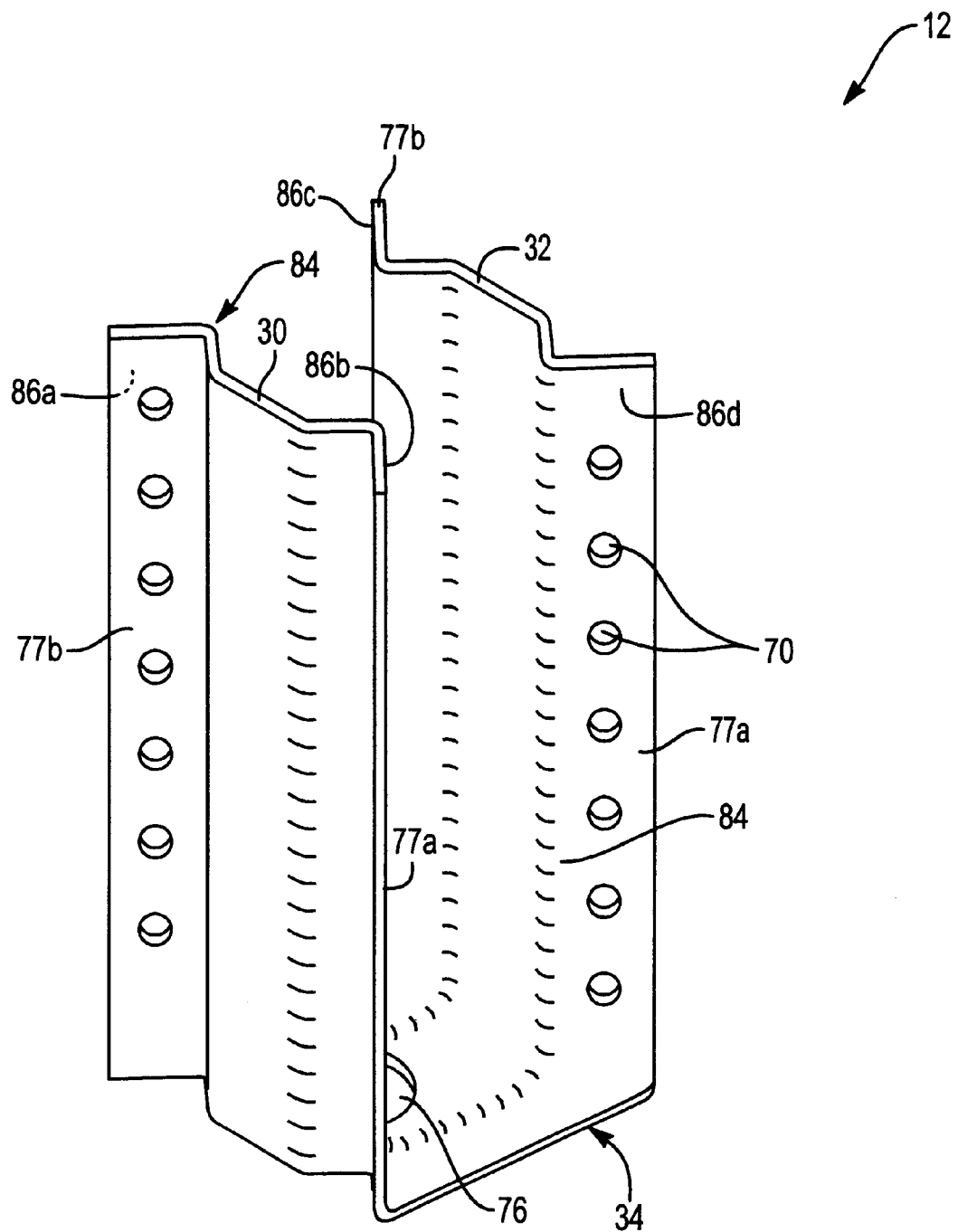
FIG. 11 is a perspective view of another embodiment of a hold-down.
Figure 12:
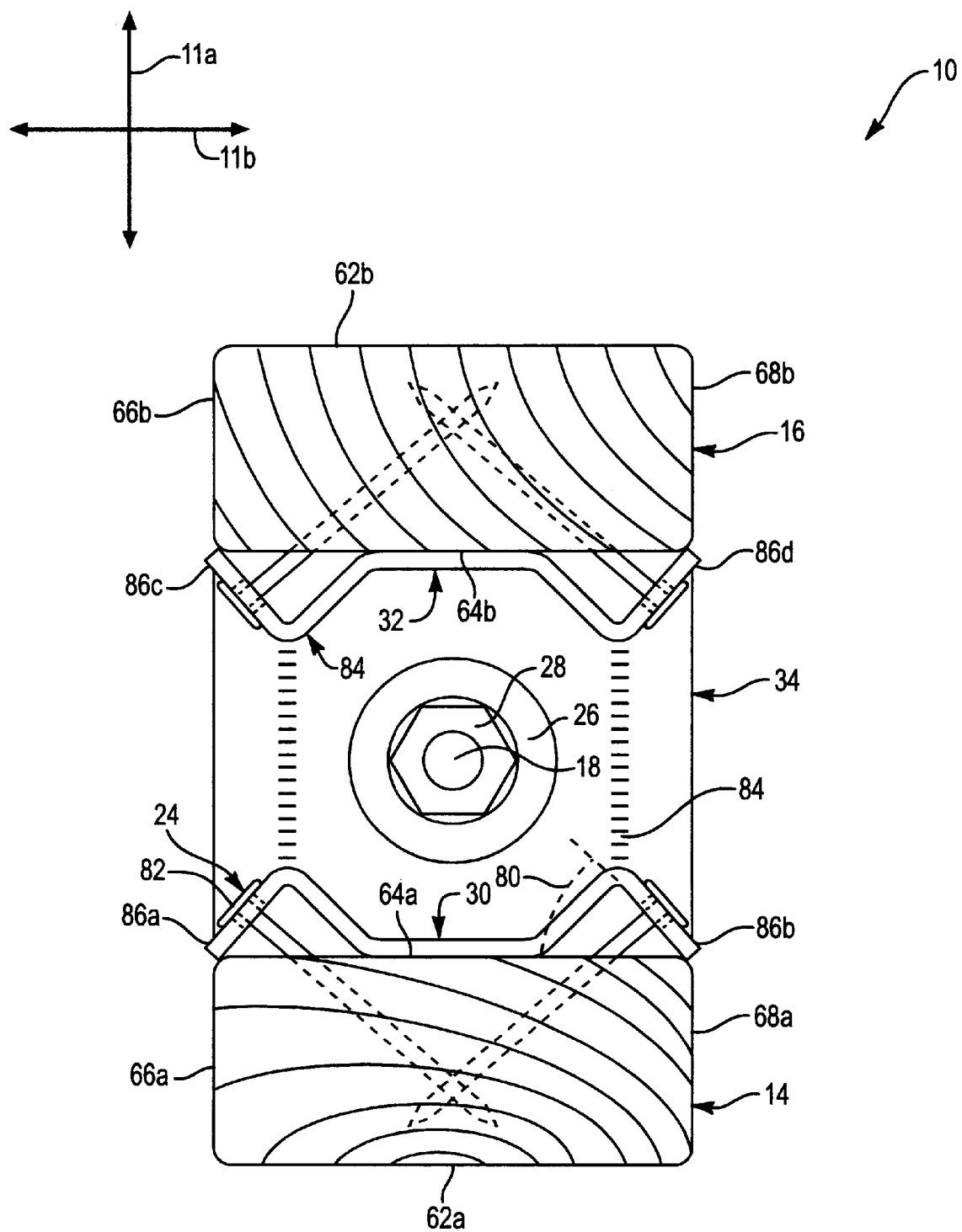
FIG. 12 is a top plan cross-sectional view of a reinforcement using the hold-down of FIG. 11.

Referring to FIGS. 11 and 12, an alternative embodiment of a hold-down 12 demonstrates an alternative manner in which the hold-down 12 embodiment may be installed. In certain embodiments, a hold-down 12 in accordance with the present invention may have multiple corrugations 84. In one embodiment, a pair of corrugations 84 may extend transversely along the lateral 77a, 77b edges of the first and second flanges 14, 16. In addition, the corrugations 84 may be formed to provide externally facing surfaces 86a, 86b, 86c, 86d. The externally facing surfaces 86 may contain a plurality of securement apertures 70. An angle 80 of the externally facing surfaces 86 with respect to the inside faces 64a, 64b of the support members 14, 16, respectively, may be selected to position the externally facing surfaces 86 parallel to a head 82 of a securement mechanism 24.

If desired, the base 34, may also contain a plurality of corrugations 84. The corrugations 84 in the base 34 may be formed to increase the rigidity thereof. The increased rigidity may obviate any need for an additional insert 36 to prevent distortion and flexing of the base 34 when a fastener 28 is tightened or when the hold-down 12 is resisting the forces applied thereto by strong winds, earthquakes, or the like. In selected applications, the base 34 may have corrugations 84, while the flanges 30, 32 have no corrugations 84.

Figure 13:
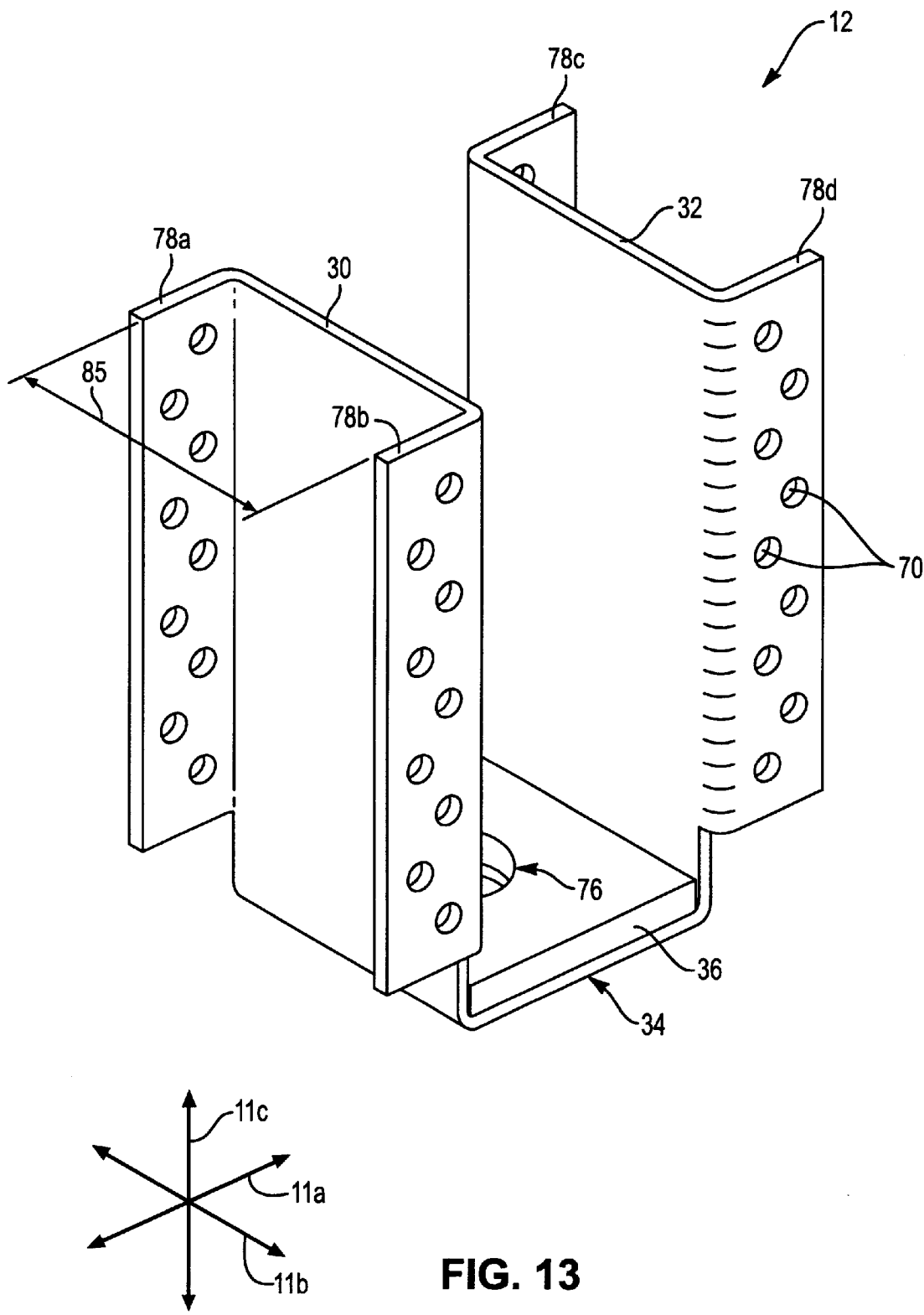
FIG. 13 is a perspective view of alternative embodiment of a hold-down.
Figure 14:
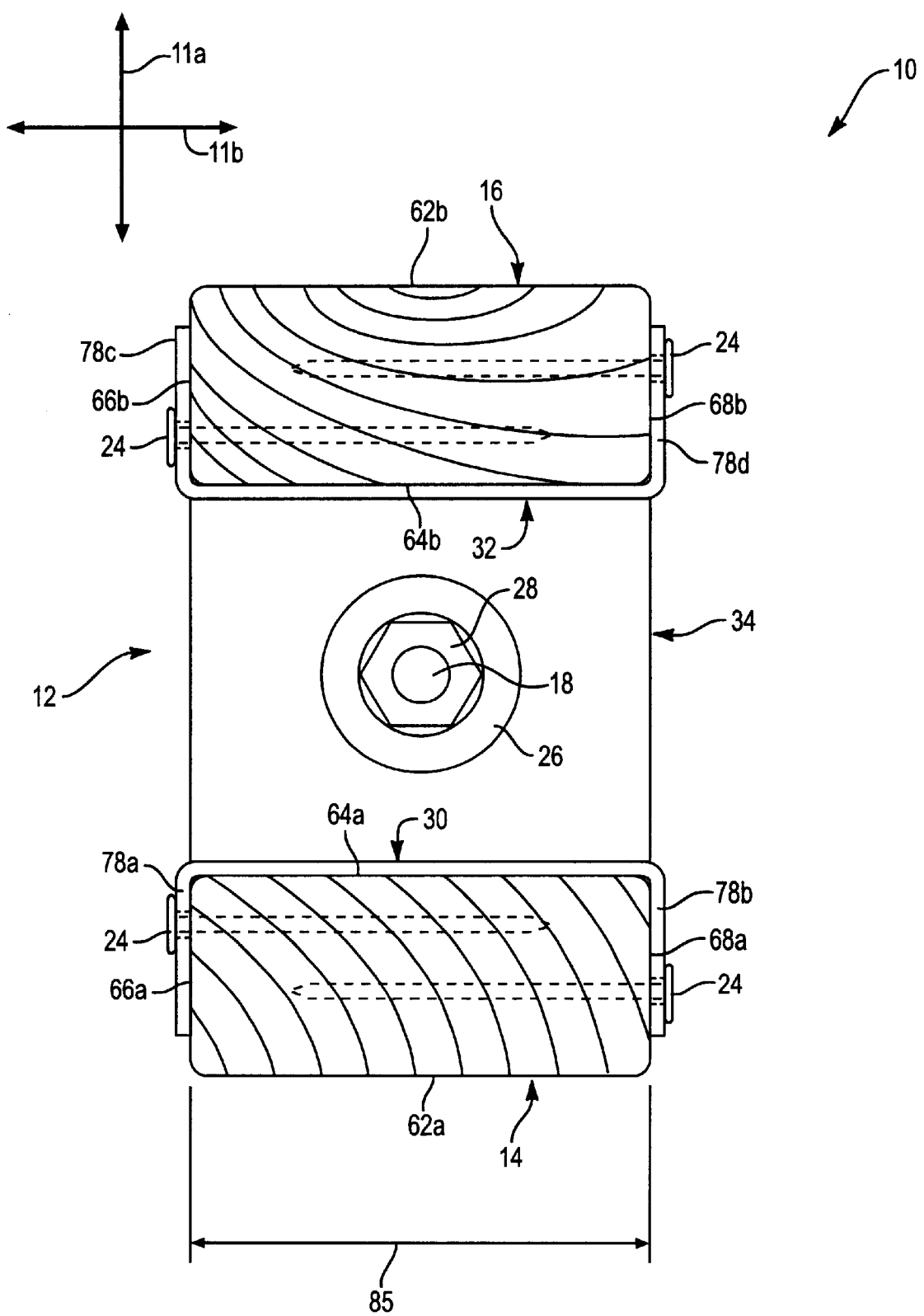
FIG. 14 is a top plan cross-sectional view of a reinforcement using the hold-down of FIG. 13.

Referring to FIGS. 13 and 14, an embodiment of a hold-down 12 demonstrates another alternative manner in which the hold-down 12 embodiment may be installed. The first and second flanges 30, 32 may be equipped with brackets 78a, 78b and 78c, 78d, respectively. In certain embodiments, brackets 78a, 78b may be formed as a continuous piece with the first flange 30. Each may bend away from the center of the hold-down 12 to form right angle with respect to the inside surface 64a of the first support member 14. In this arrangement, when the hold-down 12 is installed, the brackets 78a, 78b may be parallel to, and in contact with, the left and right sides 66a, 68a, respectively.

In a similar arrangement, the brackets 78c, 78d may be formed as a continuous piece with the second flange 32 and then bent away from the center of the hold-down 12 to form right angle with respect to the inside surface 64b of the second support member 16. When the hold-down 12 is installed, the brackets 78c, 78d may be parallel to, and in contact with, the left and right sides 66b, 68b, respectively.

The lateral distance 85 between the corresponding brackets 78a, 78b or 78c, 78d may be selected to allow the engagement of left and right sides 66a, 68a and 66b, 68b of the first or second support members 14, 16, respectively. Securement mechanisms 24 may be easily installed into the support members 14, 16 in any suitable configuration and spacing. In selected embodiments, the securement mechanisms 24, inserted through one of the brackets 78a or 78c, may be longitudinally spaced from the securement mechanisms 24 inserted through the opposing bracket 78b or 78d. This may mitigate the risk of the support member 14 or 16 splitting, if made of wood.

Figure 15:
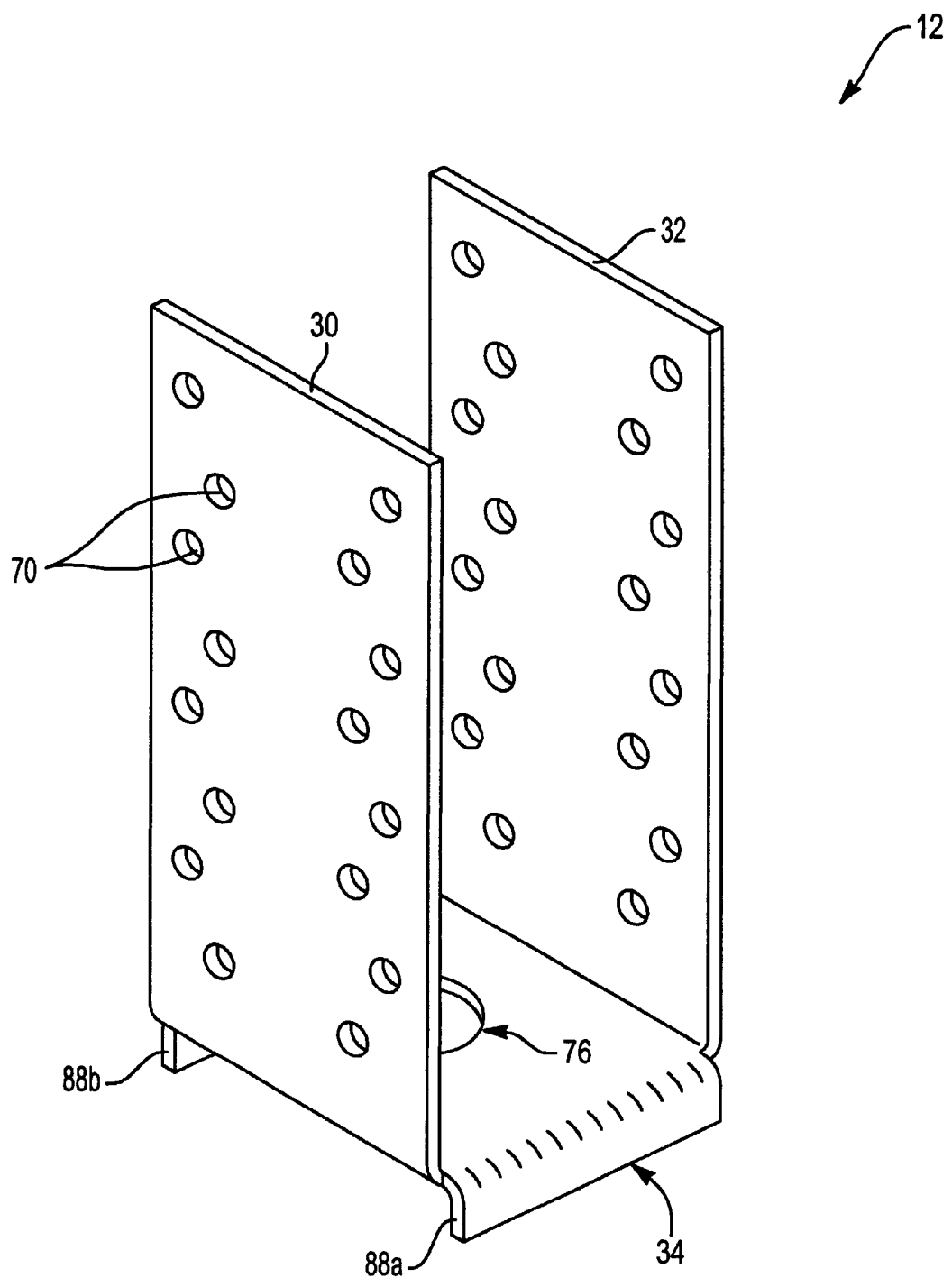
FIG. 15 is a perspective view of alternative embodiment of a hold-down.

Referring to FIG. 15, in certain embodiments, it may be desirable to reinforce the base 34 of a hold-down 12 without thickening the base 34 material or adding an insert 36. In one embodiment, the base 34 may be strengthened by the addition of tabs 88a, 88b. The base tabs 88a, 88b may be formed as a continuous piece with the base 34 and then bent away from the center of the hold-down 12 to form right angle with respect to the base 34. Such a configuration may increase the section modulus of the base 34. This configuration may resist distortion and flexing of the base 34 when a fastener 28 is tightened or when the hold-down 12 is resisting the severe operational forces applied thereto.

The base tabs 88 are illustrated with a particular hold-down 12 embodiment, but may be applied to all the embodiments of hold-downs 12 previously presented, as well as all other embodiments in accordance with the present invention.

Figure 16:
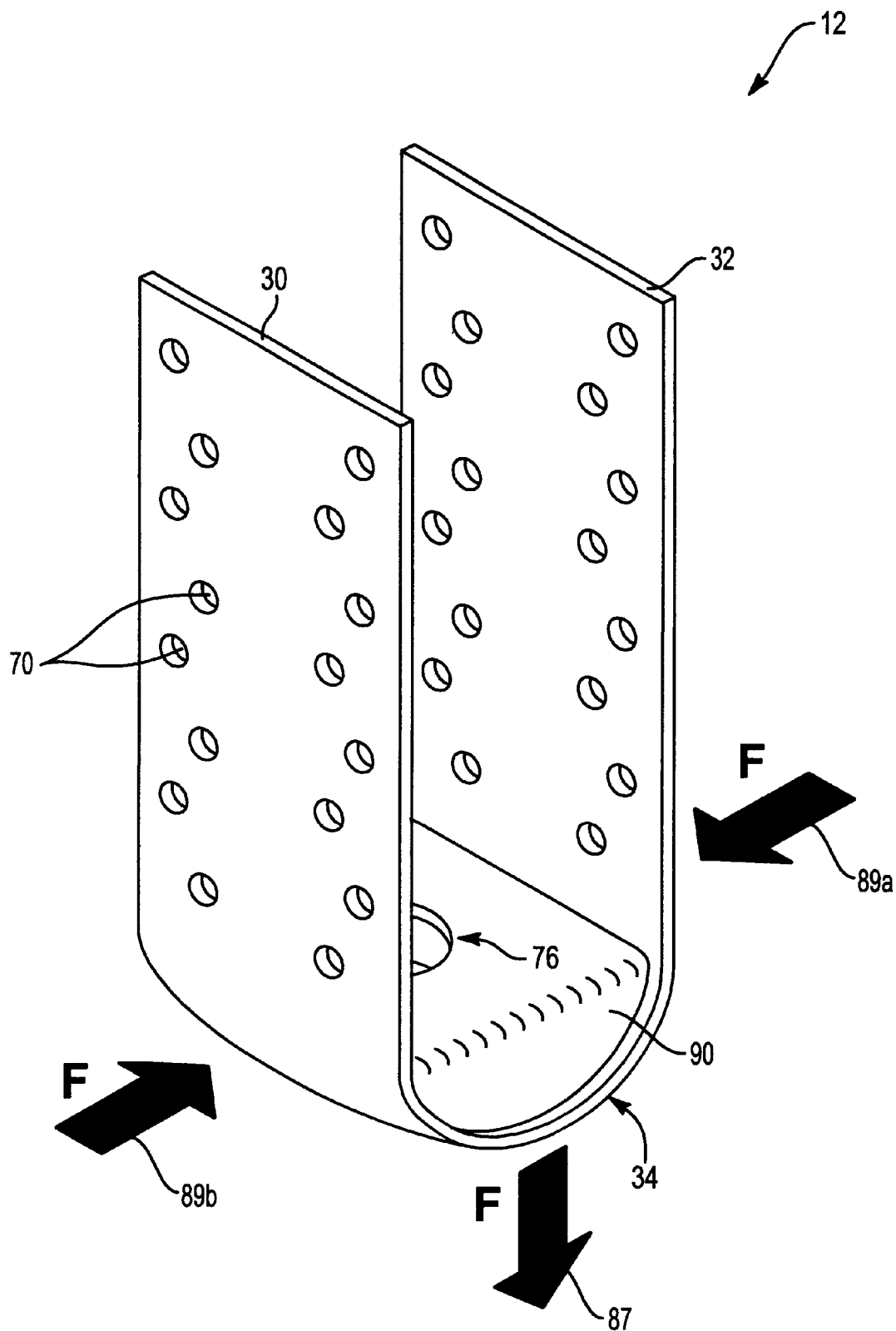
FIG. 16 is a perspective view of alternative embodiment of a hold-down.
Figure 17:
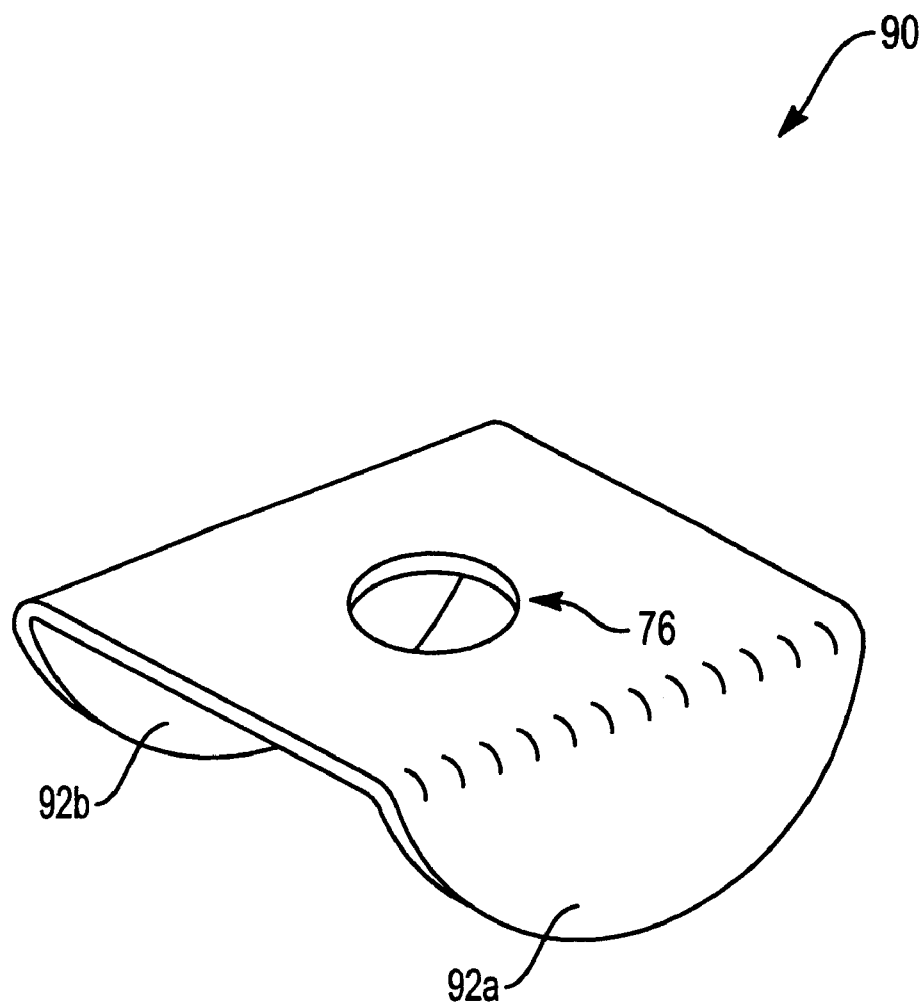
FIG. 17 is a perspective view of an embodiment of a insert that may be used in the embodiment of the hold-down illustrated in FIG. 16.

Referring to FIGS. 16 and 17, in selected embodiments, it may be advantageous to provide a hold-down 12 with a pre-deflected base 34. A pre-deflected base 34 may provide an efficient load transfer from an anchoring device 18 to the first and second flanges 30, 32. Since the base 34 has already been deflected, transverse force 87 applied by the anchoring device 18 will be transferred to longitudinal forces 89a, 89b acting on the flanges 30, 32. The longitudinal 11a forces may tend to draw the flanges 30, 32 together, pulling them longitudinally away from the support members 14, 16. To resist the longitudinal forces 89a, 89b, a curved insert 90 may be incorporated over the base 34 to resist longitudinal closing of the hold-down 12 and to provide an efficient transfer of force from the anchoring device 18 to the curved base 34.

The curved insert 90 may be made of a solid piece of any material having suitable strength and rigidity. In certain embodiments, the curved insert 90 may not be solid. For example, the curved insert 90 may be formed of a single piece of sheet metal bent to form tabs 92a, 92b. The tabs 92 may be formed to increase the section modulus of the curved insert 90 as well provide a fit to match the curve of the base 34.

From the above discussion, it will be appreciated that the present invention provides novel apparatus and methods directed to a hold-down for securing first and second support members to an anchoring device. The hold-down may have a first and a second flange, each flange having multiple securement apertures for allow securement to the first and second support members respectively. A base may connect the first and second flange and have an aperture for admitting and securing the anchoring device. When the loaded in application, the first and second flanges may be configured to be loaded in tension.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A hold-down system comprising:
  a first stud and a second stud, spaced apart and extending substantially vertically in a shear wall;
  a hold-down comprising first and second flanges, each having a first and a second surface non-coplanar with respect to one another, wherein the first surfaces abut the first and second studs, respectively, and the second surfaces are provided with securement apertures positioned to received fasteners to penetrate the first and second studs, respectively;
  an anchoring device to anchor the shear wall;
  a base connecting the first and second flanges and having an aperture sized and positioned to receive the anchoring device therethrough; and the first and second flanges configured to be loaded substantially exclusively in tension by the base and anchoring device.

2. An apparatus comprising:

first and second vertical members spaced from one another in a portion of a building;

an anchor extending toward the first and second vertical members from another portion of the building;

a first flange shaped to abut the first vertical member;

a second flange shaped to abut the second vertical member;

a plurality of fasteners the first and second flanges having securement apertures formed therein to admit selected fasteners of the plurality fasteners to secure the first flange exclusively to the first vertical member and second flange exclusively second vertical member;

a base positioned at the lower end of the first and second flanges to provide an exclusive, direct connection therebetween, the base having a penetration sized and positioned to receive the anchor therethrough; and the first and second flanges loaded substantially exclusively in tension by the base and anchor.

3. A hold-down system comprising:

a first stud and a second stud, spaced apart and extending substantially vertically in a shear wall;

a plurality of fasteners;

a hold-down comprising first and second flanges, non-coplanar with respect to one another, wherein the first flange abuts the first stud and the second flange abuts the second stud, the first and second flanges provided with securement apertures positioned to received selected fasteners of the plurality of fasteners to penetrate the first and second studs, respectively;

an anchoring device to anchor the shear wall;

a base suspended below and between the first and second flanges to form a homogeneous, monolithic piece therewith, the base having an aperture sized and positioned to receive the anchoring device therethrough; and the first and second flanges loaded substantially exclusively in tension by the base and anchoring device.

* * * * *